T. M. MOREWOOD.
NUT LOCK.
APPLICATION FILED APR. 27, 1914.
1,110,335.
Patented Sept. 15, 1914.
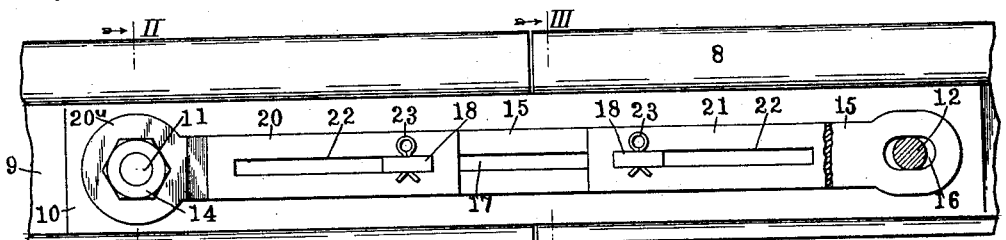
Fig. 1.
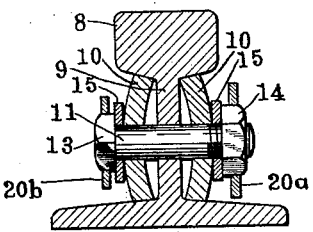
Fig. 2.
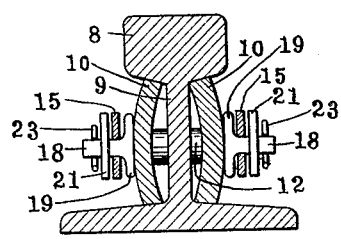
Fig. 3.
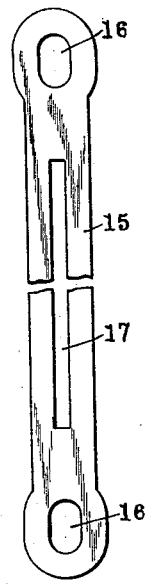
Fig. 4.
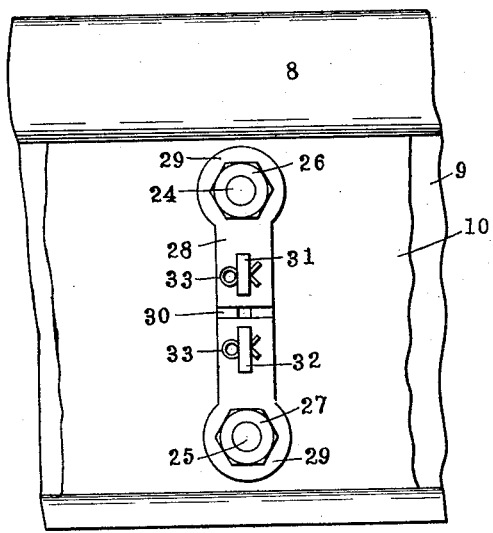
Fig. 5.
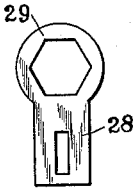
Fig. 6.
Fig. 7.
WITNESSES:
Walton Harrison
L. Altman
INVENTOR
T. M. Morewood
BY
ATTORNEY

UNITED STATES PATENT OFFICE.

THOMAS M. MOREWOOD, OF ELIZABETH, NEW JERSEY.

NUT-LOCK.

1,110,335.  Specification of Letters Patent.  Patented Sept. 15, 1914.

Application filed April 27, 1914. Serial No. 834,802.

*To all whom it may concern:*

Be it known that I, THOMAS M. MORE-WOOD, a citizen of the United States, and a resident of 135 Westfield avenue, Elizabeth, New Jersey, and whose post-office address is No. 253 Broadway, borough of Manhattan, county, city, and State of New York, have invented certain new and useful Improvements in Nut-Locks, set forth in the following specification.

My invention relates to nut locks, my more particular purpose being to provide a locking lever for holding the nut or bolt, the lever being held or confined in a predetermined position for preventing the nut or bolt from turning and thus becoming loose.

My invention further embraces a novel device for thus securing the locking lever.

The invention will be pointed out more in detail in the following claims which should be read in the light of the illustrative embodiments described in the following specification and shown in the accompanying drawings, which form a part of this application, in which like characters designate corresponding parts, and in which—

Figure 1 is a side elevation showing one form of my device, as applied to the fish plates upon a railway track, the locking levers here extending toward each other and being disposed horizontally; Fig. 2 is a section on the line II—II of Fig. 1 looking in the direction of the arrow; Fig. 3 is a section on a line III—III of Fig. 1 looking in the direction of the arrow; Fig. 4 is a detail plan of the link strap; Fig. 5 shows a form of my invention different from that appearing in Figs. 1 to 3 inclusive; Fig. 6 is a detail plan of one of the locking levers appearing in Fig. 5; Fig. 7 is a fragmentary horizontal section showing another form of my device in which the lug is carried by one of the fish plates.

Two rails are shown at 8 and are each provided with a web 9. A pair of fish plates are shown at 10 and are disposed upon opposite sides of the rail web. Bolts appear at 11—12 and each extend through a rail web and the pair of fish plates. Each bolt is provided with a head 13 integral with it and with a nut 14, the latter being revolubly fitted upon it. Disposed upon opposite sides of the rail web and fish plates are two link straps 15 each provided adjacent its end with slots 16 through which the bolts 11—12 extend. Each link strap is further provided with a slot 17 as may be understood from Fig. 4. Extending through each slot 17 is a lug 18, provided with a head 19, the latter resting against the adjacent fish plate 10. Locking levers are shown at 21 and are each provided with a slot 22 of such width as to fit neatly over the adjacent lug 18. Cotter pins are shown at 23, and extend through holes in the lugs 18. Each locking lever is provided with an enlarged portion 20ª having generally the form of an eye and fitting upon the nut 14. The head 13 of each bolt is similarly fitted with a locking lever, which for this purpose is provided with an eye 20ᵇ as shown at the left of Fig. 2.

The link straps 15 and the locking levers 20—21 are made of sheet metal, the locking levers having sufficient resilience to enable them to be sprung out slightly so as to disengage the adjacent lugs 18. Each locking lever 20—21 is adapted to serve practically as a wrench, and as such is used to tighten or loosen the nut 14. When the nuts are screwed up tight, the locking levers are brought into such position that the slots 22 register with the lugs 18, the latter being moved slidably along the slot 17, if necessary. As the lugs 18 are slidable relatively to the link straps 15, locking levers of different length may be used in connection with the same link strap.

In order to turn the nut 14 or the bolt engaging the same, its appropriate locking lever is disengaged, by first taking out the cotter pin 23 and then springing the adjacent end of the locking lever slidably away from the link strap. The locking lever may now be used practically as a wrench.

In the form shown in Fig. 5, the bolts are shown at 24—25 and are in the same vertical plane. The nuts engaging these bolts appear at 26—27 and the locking levers at 28, each locking lever being provided with an enlarged portion 29, formed into an eye, and fitting over the adjacent nut. The link strap appears at 30 and the lugs at 31—32—these lugs extending through slots in the locking levers and carrying cotter pins 33 for the purpose above indicated with reference to the cotter pins 23.

In the form shown in Fig. 4, the bolt 34 is provided with an angular portion 35 for preventing the body portion of the bolt from turning. Fitted upon the bolt is a revoluble nut 36 and engaging the latter is the locking lever 37. This locking lever is provided with a slot 38 and extending through this slot is a lug 39, the latter being mounted rigidly upon the adjacent fish plate 10. A cotter pin 40 extends through the lug 39, and normally prevents the disengagement of the locking lever 37 therefrom.

With the exceptions just noted the locking levers 28 and 37, and parts immediately associated therewith have the same function as the locking levers 20—21 and their associated parts.

In some instances I employ a locking lever which extends from one bolt to another. In this instance the locking lever is provided at one of its ends with a slot of substantially the same form as the slot 16 in Fig. 4. This slot is fitted over a bolt, and a nut is screwed up tightly against the adjacent portion of the locking lever. The other end of the locking lever has a hole for fitting upon the nut of the other bolt. By hammering the end of the locking lever this portion is fitted tightly upon the bolt.

I do not limit myself to the precise construction shown, as variations may be made therefrom without departing from the spirit of my invention as set forth in the claims annexed.

What is claimed and what is desired to be secured by United States Letters Patent is:—

1. A device of the character described comprising a pair of bolts disposed parallel with each other, a nut engaging each of said bolts, a locking lever carried by each bolt and provided with a straight portion extending outwardly from the bolt, the straight portions extending toward each other and located in a common plane, a strap link engaging said bolts, and means for detachably securing said straight portions to said stop links.

2. A device of the character described comprising a pair of bolts disposed parallel with each other, a nut engaging each of said bolts, a locking lever carried by each bolt and provided with a straight portion extending outwardly from the bolt, the straight portions extending toward each other and located in a common plane, a strap link engaging said bolts, a pair of lugs disposed intermediate said bolts and secured upon said strap link, each of said locking levers being provided with a slot through which one of said lugs extends, and a cotter pin extending through each lug for holding the adjacent locking lever in engagement with the lug.

In witness whereof, I have signed my name to this specification, in the presence of two subscribing witnesses.

THOS. M. MOREWOOD.

Witnesses:
SIDNEY NEWBORG,
WALTON HARRISON.

---

Copies of this patent may be obtained for five cents each, by addressing the "Commissioner of Patents, Washington, D. C."